United States Patent [19]
Ruschke et al.

[11] 4,222,407
[45] Sep. 16, 1980

[54] ONE-WAY FLEX VALVE

[75] Inventors: Ricky R. Ruschke, McHenry; Bette R. Schwades, Ingleside, both of Ill.

[73] Assignee: Baxter Travenol Laboratories, Inc., Deerfield, Ill.

[21] Appl. No.: 942,076

[22] Filed: Sep. 13, 1978

[51] Int. Cl.$^2$ .............................. F16K 15/14
[52] U.S. Cl. .................. 137/512.15; 137/843; 137/855
[58] Field of Search ............ 137/512.15, 843, 852, 137/854–858

[56] References Cited
U.S. PATENT DOCUMENTS

| | | | |
|---|---|---|---|
| 2,270,468 | 1/1942 | Osborne | 137/512.15 |
| 3,312,237 | 4/1967 | Mon | 137/512.15 |
| 3,831,628 | 8/1974 | Kintner | 137/512.15 |
| 3,990,439 | 11/1976 | Klinger | 137/854 X |

FOREIGN PATENT DOCUMENTS 1351384  4/1974  United Kingdom ............... 137/854

Primary Examiner—Robert G. Nilson
Attorney, Agent, or Firm—Paul C. Flattery; John P. Kirby, Jr.; George H. Gerstman

[57] ABSTRACT

A check valve is provided comprising a cap having an inlet port and a body with an internal recess whose periphery is engaged with the cap and contains an outlet port. A rib extends across the body recess and is supported and urged against the cap by the rib substantially along the entire length of the rib. The diaphragm is engaged against the cap to close the valve, with the peripheral edges of the diaphragm being adapted to bend away from the cap to open the valve when a predetermined fluid pressure is exerted at the inlet port.

15 Claims, 4 Drawing Figures

U.S. Patent    Sep. 16, 1980    4,222,407
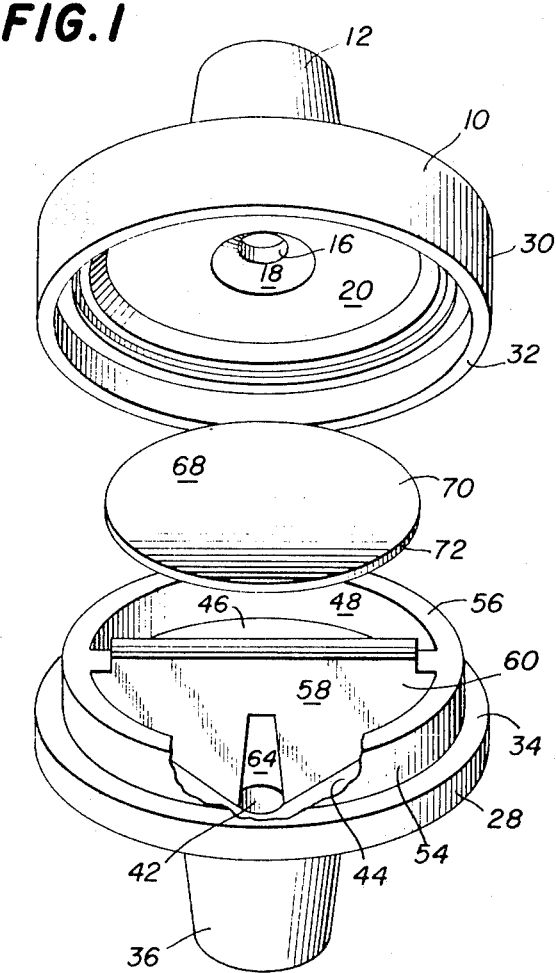
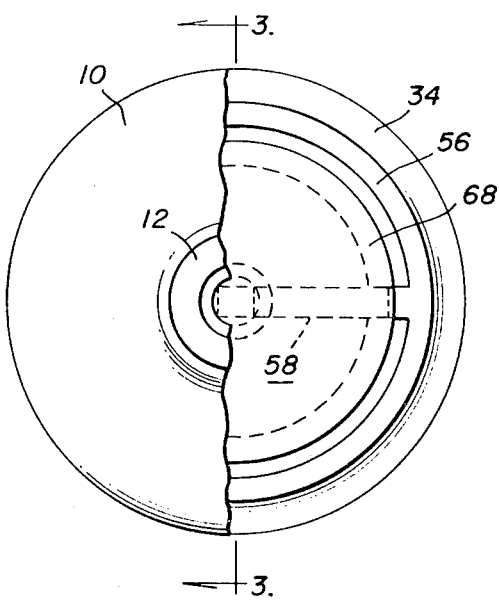
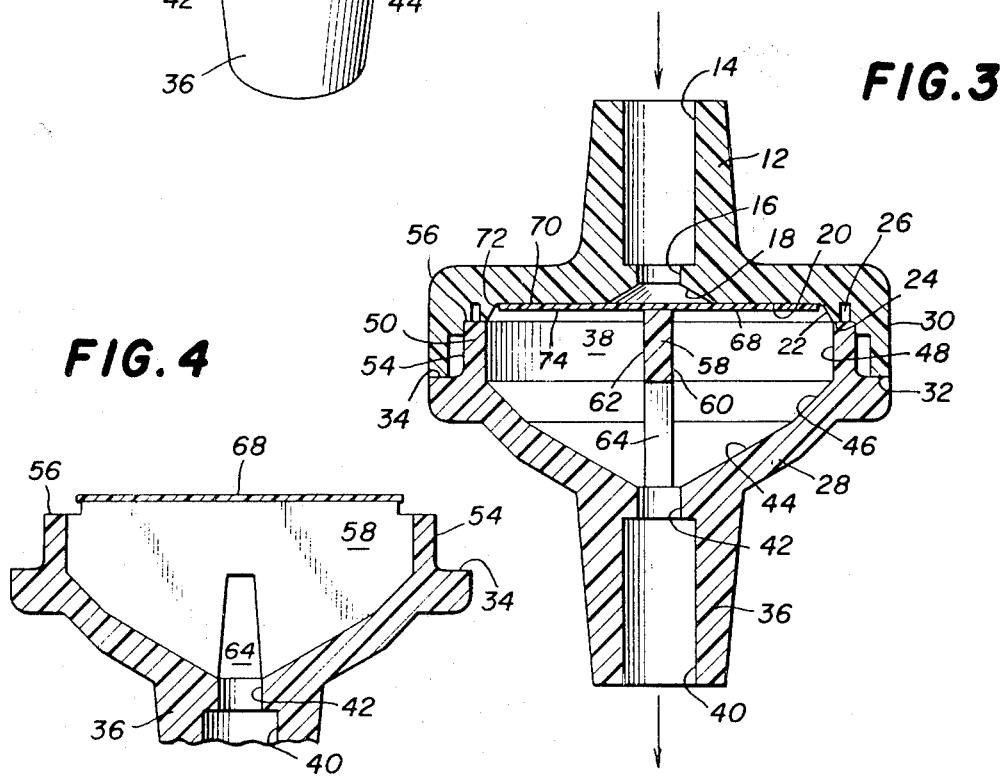

4,222,407

ONE-WAY FLEX VALVE

BACKGROUND OF THE INVENTION

This invention relates to an improved check valve for use in fluid control and is particularly suited for use in medical administration sets.

An object of the present invention is to provide for a more reliable check valve that can withstand high back pressure without failure.

A further object of the present invention is to provide for improved aerodynamic flow of the liquid within the valve when it is operating.

A still further object of the present invention is to provide for a valve assembled from only a small number of elements.

Another object of the present invention is to provide for sufficient support of the valve diaphragm to prevent unwanted movement of the diaphragm during operation.

A further object of the invention is to provide for increased sensitivity of the valve to opening and closing pressures.

Other objects and advantages of the present invention will become apparent as the description proceeds.

SUMMARY OF THE INVENTION

In accordance with the present invention, a cap containing an inlet port is peripherally engaged with a body defining a recess. A rib extends across the body recess and supports a flexible diaphragm against the cap substantially along the entire length of the rib. The diaphragm is engaged against the cap to close the valve while the peripheral edges of the diaphragm bend away from the cap to open the valve when a predetermined fluid pressure is exerted at the inlet port.

In the illustrative embodiment, the inlet port and outlet port are generally circular and the body defines a hemispherical recess. The rib is integral with the body and extends diametrically across the recess. The rib's length is longer than its width and substantially divides the body recess into two substantially equal chambers, but defines a passage in communication with the outlet port bore.

In the illustrative embodiment, the diaphragm is a disc having a diameter that is substantially equal to the length of the rib and a thickness that is less than 20 percent of the disc diameter and less than the width of the rib.

A more detailed explanation of the invention is provided in the following description and claims, and is illustrated in the accompanying drawing.

BRIEF DESCRIPTION OF THE DRAWINGS

FIG. 1 is an exploded perspective view of a check valve constructed in accordance with the principles of the present invention;

FIG. 2 is a top view thereof, with a portion broken for clarity;

FIG. 3 is a vertical cross-sectional view thereof, taken along the plane of the line 3—3 of FIG. 2; and FIG. 4 is a side elevational view of the rib, showing a portion of the device in cross-section.

DETAILED DESCRIPTION OF THE ILLUSTRATIVE EMBODIMENT

Referring to the drawings, the check valve includes a cap 10 containing an inlet port generally designated 12.

In its upper region, inlet 12 has a cylindrically-shaped bore 14, and in its lower portion inlet 12 has a smaller diameter bore 16. The walls 18 then slope outward until they meet flat surface 20. At the outer periphery of side 20, the cap slopes outward defined by surface 22 and then flattens out as defined by wall 24. An annular recess 26 acts as a flash trap to aid in the sonic welding of cap 10 and body 28. The cap 10 has an outer downwardly depending rim 30 with a bottom edge 32. Bottom edge 32 engages with annular edge 34 of body 28 when body 28 and cap 10 are joined together.

Body 28 contains an outlet port generally designated 36 and a generally hemispherical inner recess generally designated 38. In its lower region, the outlet port defines a large bore 40, while in its upper region there is a smaller cylindrical bore 42. The inner recess 38 is defined by conically sloping walls 44 and 46 and straight walls 48. Body 28 has an annular flange 50 defined by walls 48 and 54 and edge 56.

Integral with body 28 is rib 58 which spans recess 38. Rib 58 is defined by walls 60 and 62 and has a cut-out portion 64 which communicates with the upper region of outlet port 36, as seen in FIG. 4.

Flexible disc 68 has upper surface 70, outer edge 72 and lower surface 74 and is supported by rib 58 in firm contact with surface 20 of cap 10 in a closed valve position. In this manner, fluid present at the lower region of inlet 12 is prevented from entering inner recess 38 and exiting through outlet port 36 unless a predetermined inlet pressure is reached. The rib 58 holds disc 68 in firm contact with cap surface 20 such that the disc cannot shift or move around with respect to the rib 58 or cap surface 20.

When the inlet pressure attains a predetermined value between 0 and 30 inches of water, pressure is exerted upon flexible disc 68 at the lower region of inlet port 12 and causes the outer edges 72 of disc 68 to bend downward into the inner recess 38 to assume an open valve position. This enables the fluid present at inlet port 12 to flow into both sides of recess 38 and into the cut-out portion 64 in the lower region of rib 58 and exit at outlet port 36. Since the rib 58 divides recess 38 into two substantially equal chambers, there is little fluid turbulence in recess 38. The smooth recess walls 44, 46 and 48 help ensure laminar flow of the fluid into the cut-out portion 64 in the lower region of rib 58 and into the outlet port 36.

Back pressure will exist when the pressure at the outlet port 36 exceeds that pressure at the inlet port 12. Before the outlet port pressure exceeds the inlet port pressure by more than 15 inches of water under a flowing condition, the valve will close since the outlet pressure will exert force on disc surface 68 to cause the peripheral disc edge 72 to bend back causing the upper disc surface 70 to firmly engage with lower cap surface 20. This prevents fluid present at outlet port 36 from reaching inlet port 12. The valve might close at a back pressure lower than 15 inches of water under a flowing condition.

When the valve opens, disc edge 72 is free from engagement with recess walls 48, 46 and 44 since the diameter of the inner recess 38 is greater than the diameter of disc 68. This also ensures free fluid flow from the inlet port 12 into the recess 38.

For the disc to have adequate flexibility, it is preferred that its thickness be less than 20 percent of the diameter, the disc may become too stiff and the opening pressure would have to be so great that the system may be ineffective. The disc thickness should preferably be less than the thickness of the support rib 38, otherwise the rib would not provide adequate support for the disc and the disc edges might fall of their own weight to an open valve position. It is also preferable for the length of the rib across the recess 38 to be longer than the rib width.

The upper region of the outlet port 36 and the lower region of the inlet port 12 are preferably circular so that the fluid flowing therethrough will flow freely.

To ensure a tight seal when the valve is in a closed position, rib 58 must firmly engage the disc 68 against the cap surface 20. However, the pressure on the disc 68 by the rib 58 against surface 20 should not be so excessive as to compressly deform the disc's thickness to less than 30 percent of its original thickness. Too much upward pressure against the disc would cause the disc 68 to have a tendency to bend with respect to the valve seat, which is located generally where surface 18 meets surface 20, and the disc would not be seated properly.

The inlet port opening formed by the intersection of surfaces 18 and 20 should preferably have a diameter less than 60 percent of the diameter of the disc 68. If the inlet port opening to the disc were greater than 60 percent, a back pressure exerted at outlet passage 36 might cause the disc 68 to be pushed into the inlet port where it might become stuck. If the inlet port diameter is 60 percent of the disc diameter, the inlet port area will be 36 percent of the disc area. Best results have been obtained when the inlet port area is 20–30 percent of the disc area.

The valve interior is free of recesses where air might be trapped when liquid flows therethrough. This ensures that once the fluid is flowing freely, air will not enter the fluid flow and be injected into a patient when the valve is used in a medical administration set.

The cap and body should preferably be made of a rigid plastic material, but could be flexible. The diaphragm must be made of a flexible material such as rubber, silicone or vinyl.

Although an illustrative embodiment of the invention has been shown and described, it is to be understood that various modifications and substitutions and other applications with respect to fluid systems may be made without departing from the novel spirit and scope of the present invention.

What is claimed is:

1. A check valve which comprises:
   a cap;
   an inlet port extending from said cap, said inlet port defining a bore which extends through said inlet port;
   a body defining an internal opening and in peripheral engagement with said cap;
   an outlet port extending from said body and defining a bore which extends through said outlet port;
   a rib carried by said body and extending across said opening; and
   a flexible diaphragm located within said opening and supported and urged against the cap by said rib substantially along the entire length of the rib, said diaphragm being engaged against the cap to close the valve with the peripheral edges of the diaphragm being adapted to bend away from the cap to open the valve when a predetermined fluid pressure differential exists between the inlet port and the outlet port;
   said inlet port having an area less than 36 percent of the area of said flexible diaphragm, whereby said diaphragm is prevented from being pushed into said inlet port as a result of back pressure.

2. The valve according to claim 1, wherein the diaphragm is a disc having a generally uniform thickness less than 20 percent of the diameter.

3. The valve according to claim 2, wherein the inlet port is generally circular and has a diameter less than 60 percent of the disc diameter.

4. The valve according to claim 2, wherein the compression on the disc by the rib is such that the disc at the disc's compression area maintains at least 30 percent of the thickness.

5. The valve according to claim 2, wherein the opening pressure of the valve is greater than 0 but less than 30 inches of water.

6. The valve according to claim 5, wherein the closing back pressure of the valve under a flowing condition is less than 15 inches of water.

7. The valve according to claim 2, wherein the rib length is longer than its width.

8. The valve according to claim 7, wherein the rib's width is greater than the thickness of the disc.

9. The valve according to claim 7, wherein the rib extends diametrically across said body opening.

10. The valve according to claim 9, wherein the rib substantially divides the body recess into two chambers, said rib also defining a passage in communication with the outlet port bore.

11. The valve according to claim 1, wherein the rib is integral with the periphery of the recess of said body.

12. A check valve which comprises:
    a cap;
    an inlet port extending from said cap, said inlet port defining a bore which extends through said inlet port;
    a body defining an internal opening and in peripheral engagement with said cap;
    an outlet port extending from said body and defining a bore which extends through said outlet port;
    a rib carried by said body and extending diametrically across said opening, said rib having its length longer than its width and substantially dividing the body recess into two chambers, but defining a passage in communication with the outlet port bore; and
    a flexible diaphragm within said opening and supported and urged against the cap by said rib substantially along the entire length of the rib, said diaphragm being engaged against the cap to close the valve with the peripheral edges of the diaphragm being adapted to bend away from the cap to open the valve when the opening pressure is greater than 0 but less than 30 inches of water, but which closes when the closing back pressure under a flowing condition is less than 15 inches of water;
    said inlet port having an area less than 36 percent of the area of said flexible diaphragm, whereby said diaphram is prevented from being pushed into said inlet port as a result of back pressure.

13. A check valve which comprises:
    a cap;
    a generally circular inlet port extending from said cap, said inlet port defining a bore which extends through said inlet port;

a body defining a generally hemispherical internal opening and in peripheral engagement with said cap;

a generally circular outlet port extending from said body and defining a bore which extends through said outlet port;

a rib carried by and integral with said body and extending diametrically across said opening, said rib having its length longer than its width and substantially dividing the body recess into two substantially equal chambers, but defining a passage in communication with the outlet port bore; and a flexible diaphragm within said opening and supported and urged against the cap by said rib substantially along the entire length of the rib, the compression on the diaphragm by the rib against the cap is such that the diaphragm at the diaphragm compression area maintains at least 30 percent of its original thickness, said diaphragm being engaged against the cap to close the valve with the peripheral edges of the diaphragm being adapted to bend away from the cap to open the valve when the opening pressure is greater than 0 but less than 30 inches of water, but which closes the valve when the back pressure under a flowing condition is less than 15 inches of water, said diaphragm being a disc of uniform thickness whose diameter is substantially equal to the length of the rib and diameter of the body opening and whose thickness is less than 20 percent of the disc diameter and less than the width of the rib.

14. A check valve as described in claim 1, in which said flexible diaphragm is formed of silicone.

15. A check valve as described in claim 12, in which said flexible diaphragm is formed of silicone.

* * * * *